US011951491B2

(12) United States Patent
Vandepitte

(10) Patent No.: US 11,951,491 B2
(45) Date of Patent: Apr. 9, 2024

(54) SPRAY APPLICATOR

(71) Applicant: ABB Schweiz AG, Baden (CH)

(72) Inventor: Frederik Vandepitte, Reiskirchen (DE)

(73) Assignee: ABB Schweiz AG, Baden (CH)

( * ) Notice: Subject to any disclaimer, the term of this patent is extended or adjusted under 35 U.S.C. 154(b) by 336 days.

(21) Appl. No.: 16/520,399

(22) Filed: Jul. 24, 2019

(65) Prior Publication Data

US 2019/0344291 A1 Nov. 14, 2019

Related U.S. Application Data

(63) Continuation of application No. PCT/EP2017/079603, filed on Nov. 17, 2017.

(30) Foreign Application Priority Data

Jan. 25, 2017 (DE) ........................ 102017101336.9

(51) Int. Cl.
*B05B 1/04* (2006.01)
*B05B 13/02* (2006.01)

(52) U.S. Cl.
CPC .............. *B05B 1/044* (2013.01); *B05B 1/042* (2013.01); *B05B 13/0278* (2013.01)

(58) Field of Classification Search
CPC ........... B05B 1/04; B05B 1/042; B05B 1/044; B05B 1/046; B05B 1/048; B05B 15/652; B05B 15/654; B05B 13/0278; B05B 13/02; B05B 13/0207; B05B 1/1645; B05B 1/14; B05B 1/1636; B05B 1/1609; B05B 1/169; B60H 1/3414–3442; B60H 1/3407
USPC .... 239/550, 552, 553.5, 554, 555, 556, 557, 239/560, 561, 566, 567, 568, 592
See application file for complete search history.

(56) References Cited

U.S. PATENT DOCUMENTS 2,683,626 A 7/1954 Wahlin
3,885,741 A * 5/1975 Wagener ............ B22D 11/1246 239/268
5,462,230 A * 10/1995 Van Ouwerkerk .. B60H 1/3442 239/428.5
2004/0239150 A1 12/2004 Fukudome et al.
2013/0284827 A1* 10/2013 Humpal ................ B05B 1/1645 239/549

FOREIGN PATENT DOCUMENTS

DE 102005013972 A1 10/2006
DE 10297271 B4 4/2009
EP 1479293 A1 11/2004

* cited by examiner

*Primary Examiner* — Qingzhang Zhou
*Assistant Examiner* — Juan C Barrera
(74) *Attorney, Agent, or Firm* — Leydig, Voit & Mayer, Ltd.

(57) ABSTRACT

A spray applicator is disclosed. The spray applicator can include a carrier body including a number of contact surfaces and at least two nozzle bodies. Each nozzle body can be fastened on one of the contact surfaces and have a spray slit for producing a spray jet fanned out transversely to a center plane. the center planes can cross one another along a straight line. The straight line can extend outside the carrier body. The contact surfaces can face the straight line and be offset with respect to one another in the direction of the straight line.

11 Claims, 2 Drawing Sheets

SPRAY APPLICATOR

CROSS-REFERENCE TO RELATED APPLICATIONS

The present application is a continuation of International Application No. PCT/EP2017/079603 (filed on Nov. 17, 2017 and published as WO 2018/137810 on Aug. 2, 2018). The international application and publication are hereby incorporated by reference. The international application claims priority to German Application No. 10 2017 101 336.9 (filed on Jan. 25, 2017).

FIELD

Embodiments of the present invention relate to a spray applicator for applying a layer to a surface (e.g., for applying an insulating material to an automotive body sheet in motor vehicle construction).

BACKGROUND

A nozzle body is described in DE 10 2005 013 972 A1. This nozzle body has on a first end face a convexly curved spray slit. Extending from the spray slit into the nozzle body is a cavity in the form of a sector of a circle of a small thickness. A material feed bore extends from the tip of the cavity to an opposite end face of the nozzle body. The elongated spray slit forms a fan-shaped spray jet from the stream of material supplied.

When the nozzle body is moved perpendicularly to the plane in which the spray jet spreads out, the spray material is deposited as a strip extending along the direction of movement on a surface facing the spray slit. By moving over the surface a number of times along paths offset parallel to one another, a coating that is made to extend in two dimensions can be produced.

SUMMARY

A spray applicator is disclosed. The spray applicator can include a carrier body including a number of contact surfaces and at least two nozzle bodies. Each nozzle body can be fastened on one of the contact surfaces and have a spray slit for producing a spray jet fanned out transversely to a center plane. the center planes can cross one another along a straight line. The straight line can extend outside the carrier body. The contact surfaces can face the straight line and be offset with respect to one another in the direction of the straight line.

BRIEF DESCRIPTION OF THE DRAWINGS

Embodiments of the present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
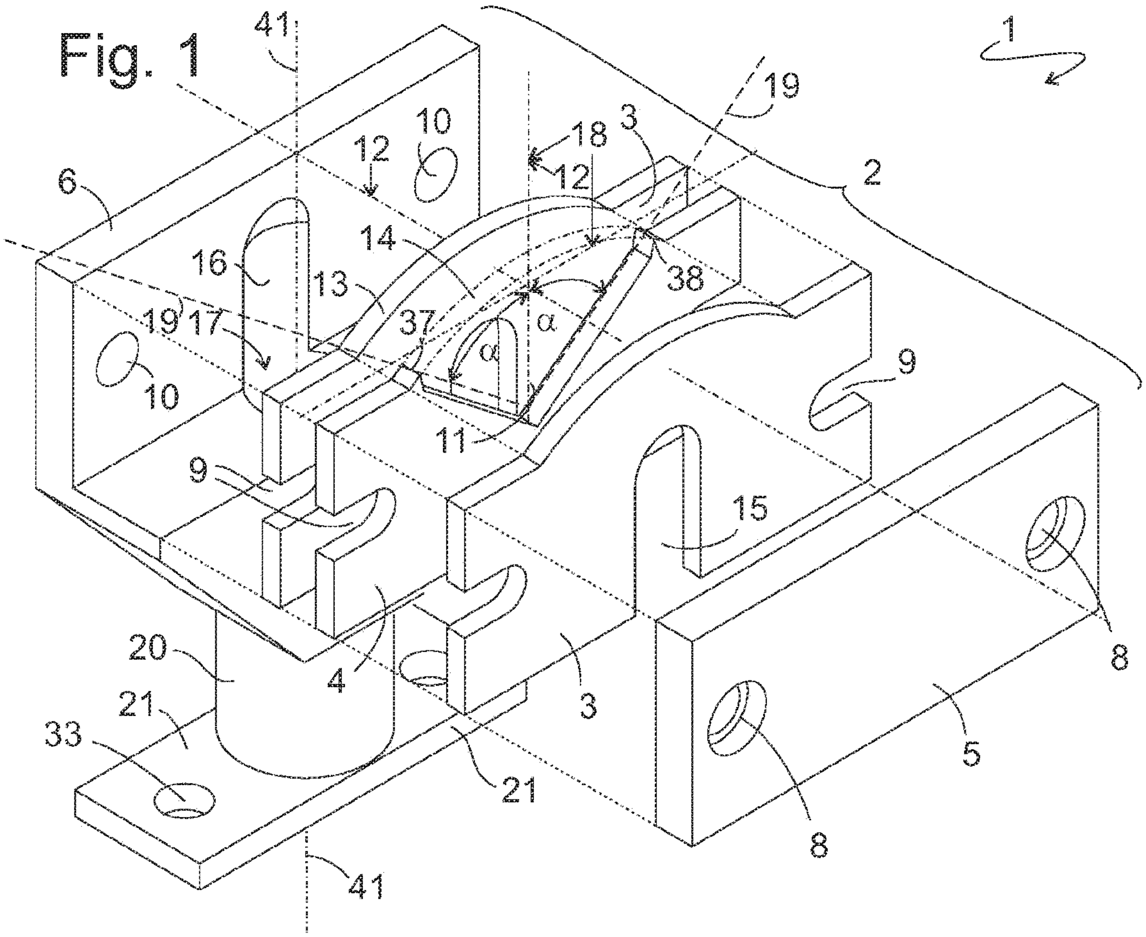
FIG. 1 is an exploded view of an exemplary nozzle body of an exemplary spray applicator.

To spray on a mat of insulating material inside a body of a motor vehicle, for example on a floor panel, a tool carrying the nozzle body can be introduced into the body through a window opening. To coat surfaces that are difficult to access in spite of the consequently restricted freedom of movement of the tool, the tool conventionally comprises a carrier body in the form of a prism, on the lateral surfaces of which the nozzle bodies are mounted so as to protrude in different directions. By selectively applying material to these nozzle bodies, spraying can be performed in different directions without having to change the orientation of the carrier body to do so, and, by moving the tool back and forth along the same path while doing so, a number of strips parallel to one another can be deposited.

However, it can be disadvantageous if the arrangement comprising the carrier body and the nozzle bodies is too bulky to fit into narrow intermediate spaces, such as for instance the interior of a door sill. Since the spray slits at the ends of the nozzle bodies remote from the carrier body are far away from one another, it may be impossible to form a continuous layer from strips adjacent to one another without gaps in between by moving the tool over the same path a number of times and in the process applying material to different nozzle bodies each time.

Among other things, the present application discloses a spray applicator that is capable of spraying in a distributed manner over a large angular range, and which at the same time can be made compact enough to get into even narrow intermediate spaces.

In an embodiment, the spray applicator includes a carrier body, which has a number of contact surfaces, with at least two nozzle bodies, wherein each nozzle body is fastened on one of the contact surfaces and has a spray slit for producing a spray jet fanned out transversely to a center plane, and wherein the center planes cross one another along a straight line, and in which the straight line extends outside the carrier body and the contact surfaces face the straight line and are offset with respect to one another in the direction of the straight line.

Although even in the case of the conventional construction there is a straight line in which the center planes of two nozzle bodies cross one another, the contact surfaces are facing away from the straight line, and the straight line extends through the carrier body. This results in a spray applicator with a star-like, bulky construction. In an embodiment of the disclosed spray applicator, on the other hand, the straight line extends through the nozzle bodies.

To keep the construction of the spray applicator simple and compact, a material feed channel that supplies the spray slit of one of the nozzle bodies can extend through the contact surface of the nozzle body.

To make efficient production and maintenance of the spray applicator possible, for example a quick change of the nozzle body in the event of clogging, the nozzle bodies can be structurally identical to one another. The nozzle bodies may be oriented in such a way that jet planes in which the spray jets of the nozzle bodies are fanned out cross one another. If the straight line in which these planes cross one another extends along a surface to be coated, this can make it easier to produce a sharply delimited layer parallel to the straight line. In some instances, it can be easier to produce a spray applicator in the case of which the spray jets are fanned out in jet planes parallel to one another.

Measured in the direction of the straight line in which the center planes of the nozzle bodies cross one another, the distance between two nozzle bodies can be less than the thickness of the nozzle bodies measured along the straight line. In an embodiment, the nozzle bodies touch one another, in order to minimize the distance of the jet planes from one another; in an embodiment, a non-vanishing distance may be required in order to ensure that, in spite of production tolerances, one nozzle body does not take up space that is required for mounting the other. In an embodiment, this distance is not more than 1 mm.

To arrange the nozzle bodies as closely clustered as possible in the direction of the straight line, but at the same time to have space available for anchoring the nozzle bodies on the carrier body, the length of the contact surfaces measured transversely to the straight line can be greater than the thickness of the nozzle bodies measured along the straight line.

For the same purpose, feet of the nozzle body lying against the contact surface can protrude from one end of a shaft of the nozzle body transversely to the straight line. These feet may have in each case a screw hole, which corresponds to a thread of the carrier body.

In an embodiment of the applicator, the distance between mutually facing ends of two spray slits can be made less than the distance between the ends of one spray slit. On the one hand, this ensures a compact structural form of the applicator, on the other hand, it is possible as a result to make the distance between the strips deposited with the aid of the two spray slits small or even to deposit the strips without any distance, merging with one another without gaps in between.

To make such depositing without gaps possible irrespective of the distance of the spray applicator from the surface to be coated, the spray jets of the first and second nozzle bodies can be adjacent to one another, seen along the straight line. A third nozzle body may be arranged on the carrier body in such a way that its spray jet overlaps with the spray jets of the first and second nozzle bodies.

FIG. 1 shows a nozzle body 1 that can be used in the spray applicator according to the invention, in an exploded view. According to the depicted embodiment, a head portion 2 of the nozzle body 1 comprises a number of plates 3, 4, 3, which in the assembled state are clamped between two clamping jaws 5, 6. The plates 3, 4, 3 and clamping jaws 5, 6 are held together with the aid of screws 7 (see FIG. 3), which extend through the countersunk bores 8 of the clamping jaw 5 that receive the heads of the screws 7 and through clearances 9 of the plates 3, 4, 3 in threaded bores 10 of the clamping jaw 6.

The plate 4 has at its upper edge a triangular clearance 11. Peripheral edges of the clearance 11 extend symmetrically on both sides of a center plane 12, which is represented in the figure by two dash-dotted straight lines defining it.

The plates 3, which flank the plate 4 on both sides, have at their upper edge in each case a projection 13 in the form of an arc of a circle. The intermediate space between the projections 13 of the two plates 3 and the clearance 11 form in the assembled state a cavity, which is made to extend transversely to the center plane 12 and the open peripheral edge of which forms between two ends 37, 38 an elongated, convexly curved spray slit 14.

The form of the spray slit 14 enforces a spreading out of the sprayed material in the form of a fan-shaped spray jet 19 with an opening angle 2$\alpha$ of for example 60° in a jet plane 18 perpendicular to the center plane 12 and parallel to the plates 3, 4, 3.

Clearances 15 of the plates 3 that are open at their peripheral edge in the downward direction and grooves 16 overlapping with them on the mutually facing flanks of the clamping jaws 5, 6 form the downstream end of a material feed channel 17, by way of which the spray slit 14 is supplied with material to be sprayed.

The head portion 2 is adjoined in the downward direction by a shaft 20. The material feed channel 17 continues by extending through the shaft 20 along the longitudinal axis 41 thereof. In the assembled state of the nozzle body 1, this longitudinal axis 41 coincides with a straight line in which the center plane 12 and the jet plane 18 cross one another. Feet 21 protrude in opposite directions from an end of the shaft 20 remote from the head portion 2.

Figure 2:
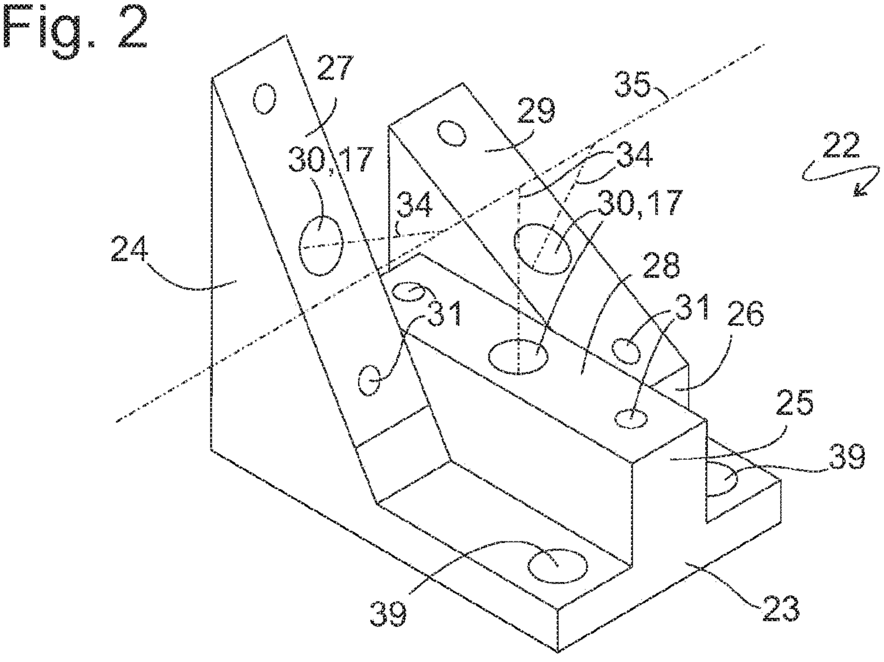
FIG. 2 shows an exemplary carrier body of the exemplary spray applicator.

FIG. 2 shows a perspective view of a carrier body 22. According to this embodiment, three pedestals 24, 25, 26 protrude from a rectangular or square baseplate 23 with edge lengths 11,12. One of these pedestals, the middle one 25, is cuboidal, with a contact surface 28 parallel to the baseplate 23. The two other pedestals 24, 26 are prism-shaped, with contact surfaces 29 and 27 respectively inclined in relation to the baseplate 23 and in relation to the contact surface 28 by $\alpha$ and 2$\alpha$, respectively. Regions of the baseplate 23 adjacent to the narrow sides of the pedestals 24, 26 are provided in each case with bores 39, which serve for fastening the baseplate on a shaft 40 (see FIG. 3).

Figure 3:
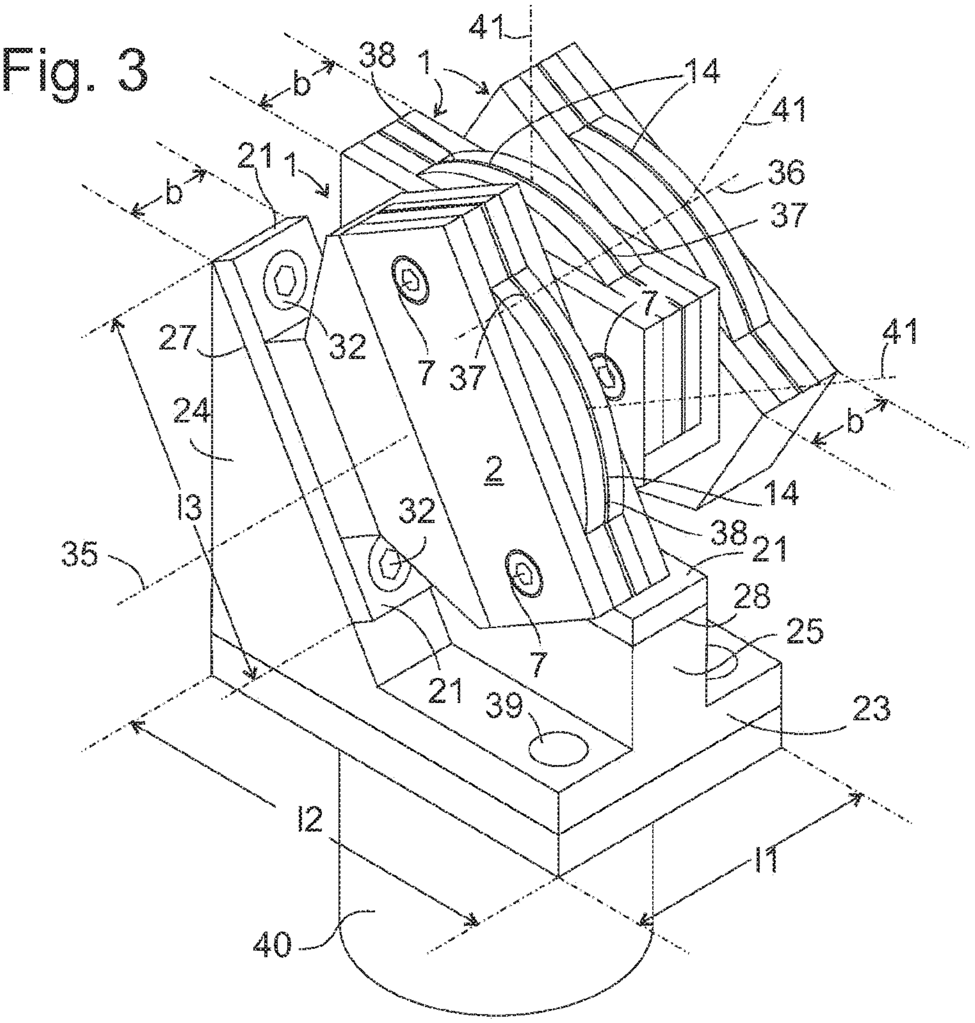
FIG. 3 shows the exemplary spray applicator upon assembly.

In the depicted embodiment, the elongatedly rectangular contact surfaces 27-29 are for mounting one of three nozzle bodies 1 that are structurally identical to one another on them in each case, as shown in FIG. 3. A through-bore 30 in the middle of each contact surface 27-29 is part of the material feed channel 17 supplying the nozzle body 1 mounted on it. On both sides of the through-bore 30 there are threaded bores 31, in which the nozzle body 1 is fastened with the aid of screws 32 extending through holes 33 of the feet 21.

Surface normals 34, which extend out of the pedestals 24, 25, 26 respectively from the center of the contact surfaces 27, 28, 29, cross a straight line 35 parallel to the contact surfaces 27, 28, 29. The straight line 35 is the same distance away from all of the contact surfaces 27, 28, 29.

In the embodiment of FIG. 3, the straight line 35 extends through the nozzle bodies 1 fastened on the contact surfaces 27, 28, 29. The longitudinal axes 41 of the nozzle bodies 1 coincide with the surface normals 34 of the contact surfaces 27, 28, 29, so that the center planes 12 (not represented in FIG. 3) of the nozzle bodies 1 cross one another along a straight line 35 and their jet planes 18 are perpendicular to one another on the straight line 35.

Since the feet 21 of the nozzle bodies 1 in each case protrude transversely to the center planes 12, although access to the screws 32 is made somewhat more difficult by head portions 2 of the nozzle bodies 1, in return it is possible to arrange the nozzle bodies 1 very close together along the straight line 35, with head portions 2 almost or actually touching one another, and thus to keep the edge length 11 of the baseplate 23 that is parallel to the straight line 35 small. The width b of the nozzle bodies 1 in the direction of the straight line 35 is one third of the edge length 11.

Referring to the embodiment of FIG. 3, the length 13 of the contact surfaces 27, 28, 29 is less than the edge length 12 of the baseplate 23. Therefore, on its narrow side facing away from the viewer in FIGS. 2 and 3, the pedestal 25 does not extend as far as the peripheral edge of the baseplate 23, so that there, between the pedestals 24, 26, there is space for a third bore, in addition to the bores 39, for anchoring on the shaft 40.

FIG. 3 shows a straight line 36 touching the projections 13 of the nozzle bodies 1 and parallel to the straight line 35. Spray slits 14 of the nozzle bodies 1 mounted on the contact surfaces 27, 28 extend on opposite sides of the plane defined by the straight lines 35, 36. The mutually facing ends 37 of these two spray slits 14 touch the straight line 36, so that, seen in the direction of the straight lines 35, 36 and as shown in the embodiment of FIG. 4, the spray jets 19 of these two nozzle bodies 1 are directly adjacent to one another.

When the spray applicator formed by the carrier body 22 and the nozzle bodies 1 mounted on it is moved along a groove-shaped concavity 38, such as for instance the inner side of a door sill, these spray jets 19 adjacent to one another make it possible to apply material to the nozzle body 1 on the contact surface 27 in the course of a movement along the concavity 38 in the direction of the straight line 35, and thus to apply a strip of material 42 on the inner side of the concavity 38, in a second movement in the same direction, without a transverse movement in the meantime, to apply by way of the nozzle body 1 a second strip of material 43, which half overlaps with the strip 42, on the contact surface 29 (concealed in FIG. 4) and in a third movement to apply with the nozzle body 1 a strip 44, which half overlaps with the strip 43, on the contact surface 28 and in this way to form a coating without gaps of a constant layer thickness apart from production tolerances.

Figure 4:
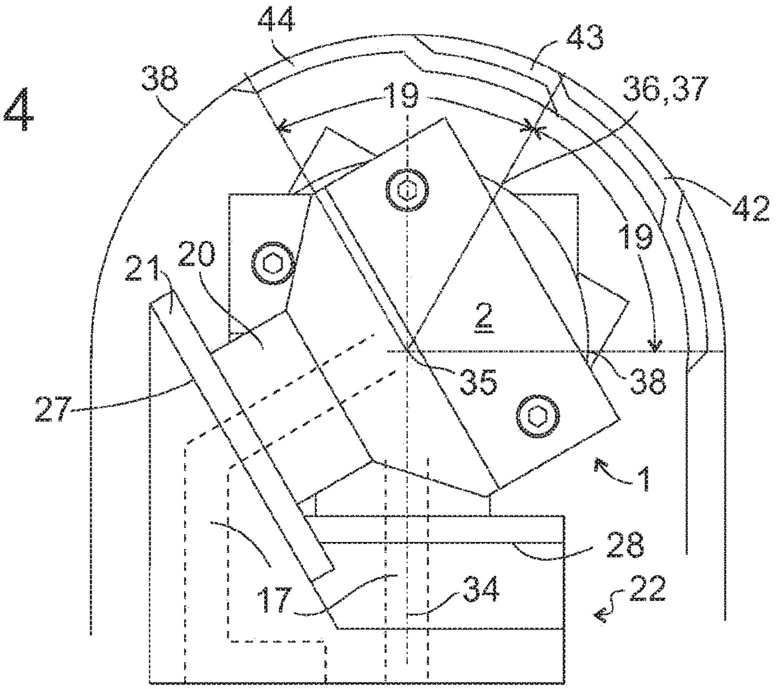
FIG. 4 shows the exemplary spray applicator during an exemplary use.

To coat the left side of the concavity 38, which is still exposed in FIG. 4, the applicator can be turned about the surface normal 34 of the contact surface 28—which here is at the same time the longitudinal axis of the shaft 40—by 180° and then once again to apply material to each nozzle body 1 in the course of three movements along the straight line 35.

Among other things, and referring to FIGS. 1-4, the present application discloses a spray applicator with a carrier body (22), which has a number of contact surfaces (27, 28, 29), with at least two nozzle bodies (1), wherein each nozzle body (1) is fastened on one of the contact surfaces (27, 28, 29) and has a spray slit (14) for producing a spray jet (19) fanned out transversely to a center plane (12), and wherein the center planes (12) cross one another along a straight line (35), wherein the straight line (35) extends outside the carrier body (22) and the contact surfaces (27, 28, 29) face the straight line (35) and are offset with respect to one another in the direction of the straight line (35).

In an embodiment, the straight line (35) extends through the nozzle body (1). In an embodiment, the material feed channel (17), which supplies the spray slit (14) of one of the nozzle bodies (1), extends through the contact surface (27, 28, 29) of the nozzle body (1). In an embodiment, the nozzle bodies (1) are structurally identical to one another. In an embodiment, the spray jets (19) are fanned out in jet planes (18) parallel to one another.

In an embodiment, the distance between two nozzle bodies (1) measured along the straight line (35) is less than the thickness of the nozzle bodies (1) measured along the straight line (35). In an embodiment, the length of the contact surfaces (26, 27, 28) measured transversely to the straight line (35) is greater than the thickness of the nozzle bodies (1) measured along the straight line (35).

In an embodiment, at least one of the nozzle bodies (1) has a shaft (20) extending transversely to its contact surface (26, 27, 28) and feet (21) protruding from one end of the shaft (20) transversely to the straight line (35) and lying against the contact surface (26, 27, 28). In an embodiment, the feet (21) have in each case a screw hole (33), which corresponds to a threaded bore (31) of the carrier body (22).

In an embodiment, the distance between mutually facing ends (37) of two spray slits (14), seen along the straight line (35), is less than the distance between the ends (37, 38) of a spray slit (14). In an embodiment, seen along the straight line (35), the spray jets (19) of the first and second nozzle bodies (1) are adjacent to one another. In an embodiment, the spray jet (19) of a third nozzle body (1) overlaps with the spray jets (19) of the first and second nozzle bodies (1).

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Nozzle body
2 Head portion
3 Plate
4 Plate
5 Clamping jaw
6 Clamping jaw
7 Screw
8 Countersunk bore
9 Clearance
10 Threaded bore
11 Clearance
12 Center plane
13 Projection
14 Spray slit
15 Clearance
16 Groove
17 Material feed channel
18 Jet plane
19 Spray jet
20 Shaft
21 Foot
22 Carrier body

23 Baseplate
24 Pedestal
25 Pedestal
26 Pedestal
27 Contact surface
28 Contact surface
29 Contact surface
30 Through-bore
31 Threaded bore
32 Screw
33 Hole
34 Surface normal
35 Straight line
36 Straight line
37 End
38 End
39 Bore
40 Shaft
41 Longitudinal axis
42 Strip
43 Strip
44 Strip

What is claimed is:

1. A spray applicator comprising:

a carrier body comprising at least three contact surfaces, the at least three contact surfaces comprising a first contact surface, a second contact surface, and a third contact surface, the second contact surface being inclined with respect to the first contact surface by an angle $\alpha$, the third contact surface being inclined with respect to the first contact surface by an angle $2\alpha$;

at least two nozzle bodies, wherein each nozzle body is fastened on one of the contact surfaces and has a spray slit for producing a spray jet fanned out transversely to a center plane, the center planes cross one another along a straight line, the straight line extends outside the carrier body, and the contact surfaces face the straight line and are offset with respect to one another in the direction of the straight line; and at least two independent material feed channels each having a through-bore, each of the material feed channels configured to independently supply the spray slit of one of the nozzle bodies and extending through the carrier body and the contact surface of the nozzle body via the through-bore.

2. The spray applicator of claim 1, wherein the straight line extends through at least one nozzle body of the at least two nozzle bodies.

3. The spray applicator of claim 1, wherein the nozzle bodies are structurally identical to one another.

4. The spray applicator of claim 1, wherein the spray jets are fanned out in jet planes parallel to one another.

5. The spray applicator of claim 1, wherein a distance between adjacent ones of the at least two nozzle bodies measured along the straight line is less than the thickness of both of the at least two nozzle bodies measured along the straight line.

6. The spray applicator of claim 5, wherein a length of the contact surfaces measured transversely to the straight line is greater than the thickness of at least one of the at least two nozzle bodies measured along the straight line.

7. The spray applicator of claim 1, wherein at least one of the nozzle bodies has a shaft extending transversely to its contact surface and feet protruding from one end of the shaft transversely to the straight line and lying against the contact surface.

8. The spray applicator of claim 7, wherein the feet have in each case a screw hole, which corresponds to a threaded bore of the carrier body.

9. The spray applicator of claim 1, wherein a distance between mutually facing sides of two spray slits of the at least two nozzle bodies, seen along the straight line, is less than the distance between the ends of a single spray slit.

10. The spray applicator of claim 1, wherein, seen along the straight line, the spray jets of the first and second nozzle bodies are adjacent to one another.

11. The spray applicator of claim 10, wherein the spray jet of a third nozzle body overlaps with the spray jets of the first and second nozzle bodies.

* * * * *